(12) United States Patent
Li et al.

(10) Patent No.: US 12,442,777 B2
(45) Date of Patent: Oct. 14, 2025

(54) SINGLE-ENDED TEST METHOD FOR WAVE-ABSORBING CHARACTERISTIC OF MATERIAL

(71) Applicant: Lanzhou University, Lanzhou (CN)

(72) Inventors: Xiling Li, Lanzhou (CN); Liang Qiao, Lanzhou (CN); Jianbo Wang, Lanzhou (CN)

(73) Assignee: Lanzhou University, Lanzhou (CN)

( * ) Notice: Subject to any disclaimer, the term of this patent is extended or adjusted under 35 U.S.C. 154(b) by 317 days.

(21) Appl. No.: 17/874,937

(22) Filed: Jul. 27, 2022

(65) Prior Publication Data

US 2023/0065531 A1 Mar. 2, 2023

(30) Foreign Application Priority Data

Aug. 25, 2021 (CN) .......... 202110980045.X

(51) Int. Cl.
*G01N 22/00* (2006.01)
*G01R 27/26* (2006.01)

(52) U.S. Cl.
CPC ......... *G01N 22/00* (2013.01); *G01R 27/2623* (2013.01)

(58) Field of Classification Search
CPC .... G01N 22/00; G01R 27/04; G01R 27/2623; G01R 1/00; G01R 3/00; G01R 5/00; G01R 7/00; G01R 9/00; G01R 11/00; G01R 13/00; G01R 15/00; G01R 17/00; G01R 19/00; G01R 21/00; G01R 22/00; G01R 23/00; G01R 25/00; G01R 27/00; G01R 29/00; G01R 31/00; G01R 33/00; G01R 35/00
See application file for complete search history.

(56) References Cited

U.S. PATENT DOCUMENTS

| | | | | |
|---|---|---|---|---|
| 2003/0107382 A1* | 6/2003 | Kreager | ............... | H01R 24/542 324/538 |
| 2014/0377989 A1* | 12/2014 | Yang | ........................ | H01R 9/05 439/581 |

FOREIGN PATENT DOCUMENTS

| | | | | |
|---|---|---|---|---|
| CN | 105929246 A | * | 9/2016 | ......... G01R 27/2623 |
| TW | 201530152 A | * | 8/2015 | ......... G01R 1/06705 |

* cited by examiner

*Primary Examiner* — Judy Nguyen
*Assistant Examiner* — Brent J Andrews
(74) *Attorney, Agent, or Firm* — Bochner PLLC; Andrew D. Bochner

(57) ABSTRACT

Disclosed is a single-ended test method for the wave-absorbing characteristic of a material. The device comprises a sample cavity, a microwave transmission rod, spring needles, an SMA joint and a vector network analyzer, wherein one end of the sample cavity is provided with a test fixture; the microwave transmission rod is arranged in the sample cavity and is connected with the test fixture in a penetrating mode; the spring needles are arranged in the microwave transmission rod; the SMA joint is arranged at the other end of the sample cavity; the receiving end of the vector network analyzer is electrically connected with a coaxial cable, and the other end of the coaxial cable is electrically connected with the other end of the SMA joint.

4 Claims, 3 Drawing Sheets

SINGLE-ENDED TEST METHOD FOR WAVE-ABSORBING CHARACTERISTIC OF MATERIAL

CROSS REFERENCE TO RELATED APPLICATION

This patent application claims the benefit and priority of Chinese Patent Application No. 202110980045.X, filed on Aug. 25, 2021, the disclosure of which is incorporated by reference herein in its entirety as part of the present application.

TECHNICAL FIELD

The present disclosure relates to a test method for the wave-absorbing characteristic of a material, specifically relates to a single-ended test method for the wave-absorbing characteristic of a material, and belongs to the technical field of vector network testing.

BACKGROUND ART

The wave-absorbing characteristic of a material is a material performance which is widely concerned at present, and the related field is wide, particularly, the stealth technology is much concerned. Therefore, the test method and means for the wave-absorbing characteristic of a material are hot points of great concern in the field. At present, the main test methods for the wave-absorbing characteristic of a material comprise an arch method and a double-end test electromagnetic parameter inversion method.

The arch method test requires a large amount of expenditure for building a darkroom and building an arch method. The arch method has high requirements on experimental conditions. The test cannot be carried out in a laboratory without corresponding equipment, so that the precision is relatively high, and the test is limited.

The wave-absorbing characteristic of a material is reversely deduced through the electromagnetic characteristic. First of all, the data are not directly obtained. In addition, the reversely deduced result is affected by electromagnetic parameters, and the accuracy of the test result directly affects the test result of the wave-absorbing characteristic.

SUMMARY

The present disclosure aims to provide a single-ended test method for the wave-absorbing characteristic of a material in order to solve the above problems.

The above purposes are achieved through the following technical scheme. A single-ended test device for the wave-absorbing characteristic of a material comprises:
a sample cavity, one end of the sample cavity being provided with a test fixture;
a microwave transmission rod, the microwave transmission rod being arranged in the sample cavity and being connected with the test fixture in a penetrating mode;
spring needles, the two spring needs being respectively arranged at the two ends of the microwave transmission rod, and one of the spring needles being connected with the test fixture in a penetrating mode;
an SMA joint, the SMA joint being arranged at the other end of the sample cavity and being connected with the other spring needle in a penetrating mode; and
a vector network analyzer, the receiving end of the vector network analyzer being electrically connected with a coaxial cable, and the other end of the coaxial cable being electrically connected with the wiring end of the SMA joint.

Preferably, embedding grooves are formed in the two ends of the microwave transmission rod respectively, and the two spring needles are connected into the two embedding grooves in a penetrating mode respectively.

Preferably, the test fixture comprises a short-circuit joint, a non-magnetic metal block is arranged on the front face of the short-circuit joint, a first contact hole is formed in the middle of the front face of the non-magnetic metal block, one end of the spring needle is connected with the first contact hole in a penetrating mode, the inner wall of one end of the sample cavity is provided with an internal thread, the outer wall of the non-magnetic metal block is provided with an external thread, and the internal thread is matched with the external thread.

Preferably, a second contact hole is formed in the back face of the SMA joint, and the other end of the spring needle is connected with the second contact hole in a penetrating mode.

Preferably, the spring needle comprises a metal needle and a telescopic spring, the telescopic spring is arranged in the embedding groove, one of the metal needles is slidably connected with the first contact hole in a penetrating mode, and the other metal needle is slidably connected with the second contact hole in a penetrating mode.

Disclosed is a single-ended test method for the wave-absorbing characteristic of a material. The single-ended test method for the wave-absorbing characteristic of a material comprises the following steps:
step one, firstly placing a to-be-tested sample in a sample cavity;
step two, enabling the short-circuit joint and the sample cavity to be in tight threaded connection through the non-magnetic metal block, and meanwhile embedding one end of the spring needle into the first contact hole;
step three, pushing the to-be-tested sample to the bottom of the sample cavity through a Teflon push rod, so that the to-be-tested sample is in contact with the non-magnetic metal block; and
step four, embedding the other end of the spring needle into a second contact hole, and starting sample detection by matching with a vector network analyzer.

The present disclosure has the following beneficial effects.

The wave-absorbing characteristic of a material is tested by utilizing the single-ended method. The wave-absorbing characteristic of a material can be obtained by intuitively testing S11 through the vector network analyzer according to the single-ended method. Meanwhile, test equipment does not need to be rebuilt, a darkroom does not need to be built, or arch test equipment does not need to be built. The test method can be used as another complementary test method of an arch method, or the test method and the arch method are used for mutual verification.

Figure 1:
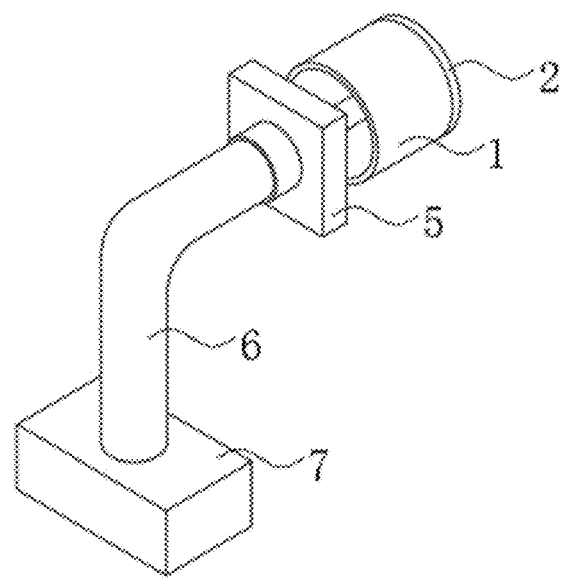
FIG. 1 is an integral structural schematic diagram of the present disclosure.
Figure 2:
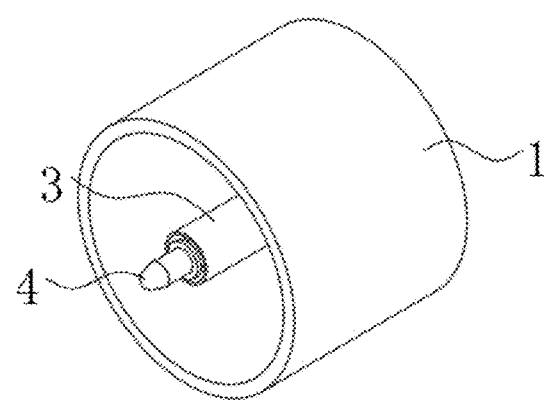
FIG. 2 is a connected structural schematic diagram of a sample cavity, a spring needle and a microwave transmission rod in the present disclosure.
Figure 3:
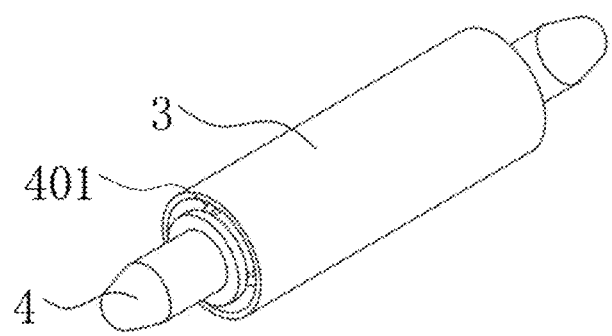
FIG. 3 is a connected schematic diagram of a microwave transmission rod and spring needles in the present disclosure.
Figure 4:
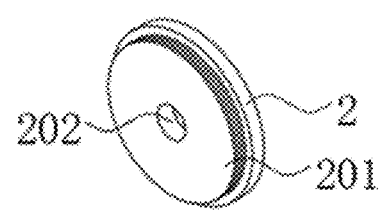
FIG. 4 is a structural schematic diagram of a test fixture in the present disclosure.
Figure 5:
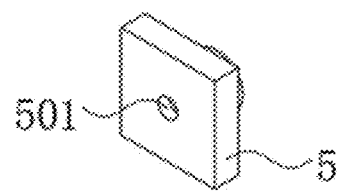
FIG. 5 is a structural schematic diagram of an SMA joint in the present disclosure.

Reference signs: 1, sample cavity; 2, short-circuit joint; 201, non-magnetic metal block; 202, first contact hole; 3, microwave transmission rod; 4, metal needle; 401, telescopic spring; 5, SMA joint; 501, second contact hole; 6, coaxial cable; and 7, vector network analyzer.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Referring to FIG. 1 to FIG. 6, a single-ended test device for the wave-absorbing characteristic of a material comprises:

a sample cavity 1, one end of the sample cavity 1 being provided with a test fixture;

the test fixture comprises a short-circuit joint 2, a non-magnetic metal block 201 is arranged on the front face of the short-circuit joint 2, a first contact hole 202 is formed in the middle of the front face of the non-magnetic metal block 201, one end of the spring needle is connected with the first contact hole 202 in a penetrating mode, the inner wall of one end of the sample cavity 1 is provided with an internal thread, the outer wall of the non-magnetic metal block 201 is provided with an external thread, and the internal thread is matched with the external thread;

the non-magnetic metal block 201 has good conductivity, the diameter and size of the first contact hole 202 are matched with the diameter and size of the spring needle, the spring needle and the short-circuit joint 2 can be in tight contact connection through the first contact hole 202, and the test clamp and the sample cavity 1 can be in tight threaded connection through connection of the internal thread and the external thread;

a microwave transmission rod 3, the microwave transmission rod 3 being arranged in the sample cavity 1 and being connected with the test fixture in a penetrating mode;

embedding grooves are formed in the two ends of the microwave transmission rod 3 respectively, and the two spring needles are connected into the two embedding grooves in a penetrating mode respectively;

spring needles, the two spring needs being respectively arranged at the two ends of the microwave transmission rod 3, and one of the spring needles being connected with the test fixture in a penetrating mode;

the spring needle comprises a metal needle 4 and a telescopic spring 401, the telescopic spring 401 is arranged in the embedding groove, one of the metal needles 1 is slidably connected with the first contact hole 202 in a penetrating mode, and the other metal needle 4 is slidably connected with the second contact hole 501 in a penetrating mode;

the telescopic spring 401 has good telescopic elasticity and can support the two metal needles 4 to slide in the two embedding grooves by a certain distance;

an SMA joint 5, the SMA joint 5 being arranged at the other end of the sample cavity and being connected with the other spring needle in a penetrating mode;

the SMA joint 5 is completely matched with the other end of the sample cavity 1, so that the SMA joint 5 can be tightly connected with the other end of the sample cavity 1;

a second contact hole 501 is formed in the back face of the SMA joint 5, and the other end of the spring needle is connected with the second contact hole 501 in a penetrating mode;

the size of the second contact hole 501 is matched with the size of the other end of the spring needle, and the other end of the spring needle is in close contact with the SMA joint 5 through the second contact hole 501; and a vector network analyzer 7, the receiving end of the vector network analyzer 7 being electrically connected with a coaxial cable 6, and the other end of the coaxial cable 6 being electrically connected with the wiring end of the SMA joint 5.

Disclosed is a single-ended test method for the wave-absorbing characteristic of a material. The single-ended test method for the wave-absorbing characteristic of a material comprises the following steps:

step one, firstly placing a to-be-tested sample in the sample cavity 1;

step two, enabling the short-circuit joint 2 and the sample cavity 1 to be in tight threaded connection through the non-magnetic metal block 201, and meanwhile embedding one end of the spring needle into the first contact hole 202;

step three, pushing the to-be-tested sample to the bottom of the sample cavity 1 through a Teflon push rod, so that the to-be-tested sample is in contact with the non-magnetic metal block 201;

the Teflon push rod is a specially-made hollow push rod matched with the to-be-tested sample in size, the to-be-tested sample is pushed to the bottom of the sample cavity 1, the sample and the non-magnetic metal block 201 are in complete contact, and therefore the test authenticity of microwave signals is guaranteed; and step four, embedding the other end of the spring needle into a second contact hole 501, and starting sample detection by matching with a vector network analyzer 7.

Figure 6:
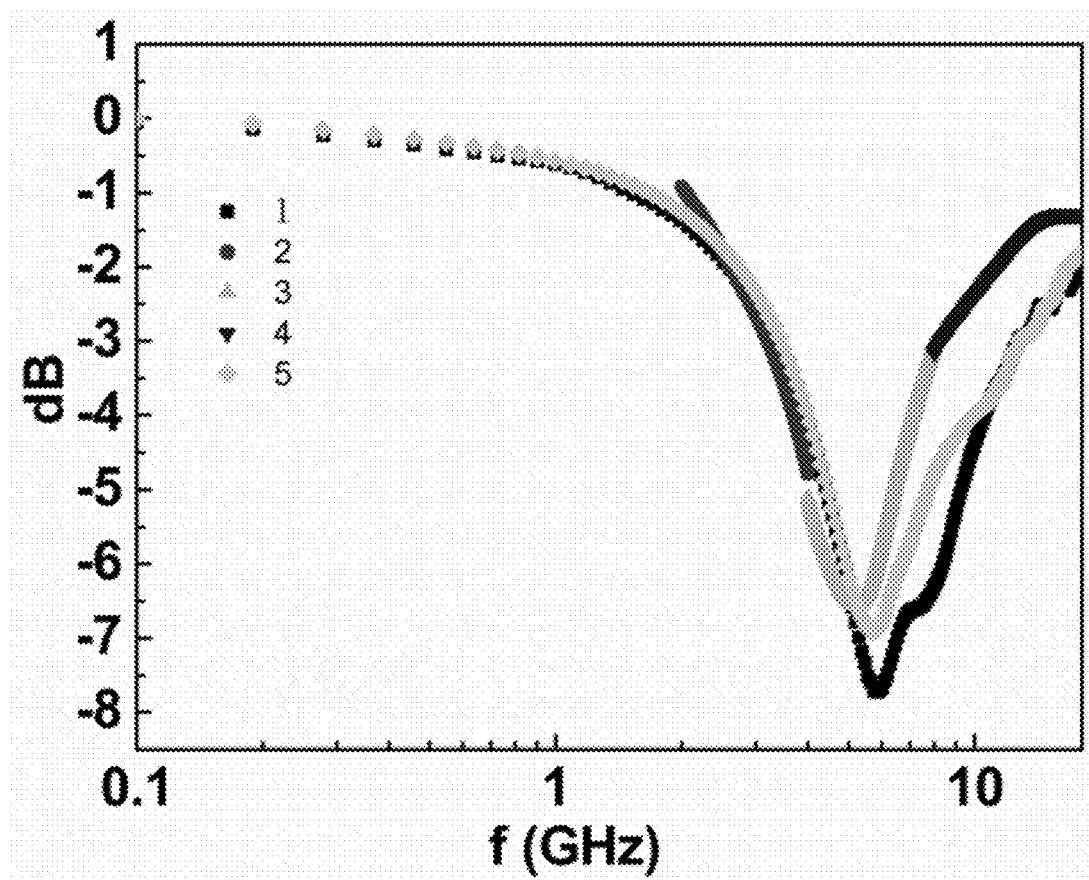
FIG. 6 is a schematic diagram of the test process in the present disclosure.

In the embodiment, after the to-be-tested sample is put into the test device through the testing steps, a testing result as shown in FIG. 6 is obtained. In the figures, line 1 represents a result tested by an inversion method, line 2, line 3 and line 4 respectively represent an arch method of segmented data tested by using loudspeakers of different frequency bands, and line 5 represents a single-ended short-circuit method. It can be seen from FIG. 6 that the single-ended method is comparatively consistent with the arch method and the inversion method.

Further, it should be understood that although the present specification is described with reference to embodiments, not each embodiment contains only one independent technical scheme. The specification is so described just for clarity. Those skilled in the art should regard the specification as a whole, and technical schemes of various embodiments can be combined appropriately to form other implementations which can be understood by those skilled in the art.

What is claimed is:

1. A single-ended test device for the wave-absorbing characteristic of a material, comprising:
    a sample cavity having one end provided with a test fixture;
    a microwave transmission rod arranged in the sample cavity and connected with the test fixture in a penetrating mode;
    two spring needles, respectively arranged at the two ends of the microwave transmission rod, wherein one spring needle of the two spring needles being connected with the test fixture in a penetrating mode;
    an SMA joint arranged at another end of the sample cavity and connected with the other spring needle of the two spring needles in a penetrating mode; and
    a vector network analyzer having a receiving end electrically connected with a coaxial cable, and another end of the coaxial cable being electrically connected with a wiring end of the SMA joint;
    wherein the test fixture comprises a short-circuit joint, a non-magnetic metal block is arranged on the front face of the short-circuit joint and is configured to place and contact with a sample, a first contact hole is formed in a middle of a front face of the non-magnetic metal block, one end of the one spring needle is connected with the first contact hole in a penetrating mode, an inner wall of one end of the sample cavity is provided with an internal thread, an outer wall of the non-magnetic metal block is provided with an external thread, and the internal thread is matched with the external thread; and
    wherein the single-ended test device is configured to measure the wave-absorbing characteristic of a material to be measured.

2. The single-ended device for the wave-absorbing characteristic of a material according to claim 1, wherein embedding grooves are formed in the two ends of the microwave transmission rod respectively, and the two spring needles are connected into the two embedding grooves in a penetrating mode respectively.

3. The single-ended test device for the wave-absorbing characteristic of a material according to claim 1, wherein a second contact hole is formed in the back face of the SMA joint, and the other end of the spring needle is connected with the second contact hole in a penetrating mode.

4. The single-ended test device for the wave-absorbing characteristic of a material according to claim 1, wherein the spring needle comprises a metal needle and a telescopic spring the telescopic spring is arranged in the embedding groove, one of the metal needles is slidably connected with the first contact hole in a penetrating mode, and the other metal needle is slidably connected with the second contact hole in a penetrating mode.

* * * * *